(12) United States Patent
Kim et al.

(10) Patent No.: US 7,984,664 B2
(45) Date of Patent: Jul. 26, 2011

(54) ORGAN TYPE ACCELERATOR PEDAL FOR VEHICLE

(75) Inventors: Kyungmin Kim, Busan (KR); Donghwan Kim, Ulsan (KR); Taeho Kim, Ulsan (KR)

(73) Assignee: Donghee Industrial Co., Ltd., Ulsan Metropolitan City (KR)

( * ) Notice: Subject to any disclaimer, the term of this patent is extended or adjusted under 35 U.S.C. 154(b) by 939 days.

(21) Appl. No.: 11/902,023

(22) Filed: Sep. 18, 2007

(65) Prior Publication Data

US 2008/0083295 A1 Apr. 10, 2008

(30) Foreign Application Priority Data

Oct. 4, 2006 (KR) .................. 10-2006-0097637

(51) Int. Cl.
*G05G 1/30* (2008.04)
(52) U.S. Cl. .............................. 74/513; 74/512; 74/560
(58) Field of Classification Search .............. 74/512, 74/513, 560; 200/52 R; 464/106
See application file for complete search history.

(56) References Cited

U.S. PATENT DOCUMENTS

| | | | | |
|---|---|---|---|---|
| 2,684,413 A | * | 7/1954 | Ripple | 200/52 R |
| 3,541,881 A | * | 11/1970 | Pharis | 74/512 |
| 3,955,378 A | * | 5/1976 | Allonca | 464/106 |
| 4,218,937 A | * | 8/1980 | Albrecht et al. | 74/513 |
| 5,063,811 A | | 11/1991 | Smith et al. | |
| 6,520,046 B2 | | 2/2003 | Djordjevic et al. | |
| 6,626,061 B2 | | 9/2003 | Sakamoto et al. | |
| 7,895,915 B2 | * | 3/2011 | Kim et al. | 74/513 |
| 2007/0193401 A1 | * | 8/2007 | Campbell | 74/560 |
| 2009/0293666 A1 | * | 12/2009 | Kim et al. | 74/513 |

FOREIGN PATENT DOCUMENTS

| | | | |
|---|---|---|---|
| DE | 3111861 A1 | * | 10/1982 |
| DE | 3932529 A1 | * | 4/1991 |
| EP | 1440858 A1 | * | 7/2004 |
| JP | 2001-249729 | | 9/2001 |
| JP | 2001-270343 | | 10/2001 |
| JP | 2002-36904 | | 2/2002 |

OTHER PUBLICATIONS

Derwent English Abstract of DE 3111861 A, Oct. 14, 1982.*
English Abstract of DE 3932529A1, Apr. 11, 1991.*

* cited by examiner

*Primary Examiner* — Vinh T. Luong
(74) *Attorney, Agent, or Firm* — Dickstein Shapiro LLP

(57) ABSTRACT

An organ type accelerator pedal includes a footplate, a housing, and a pedal arm. One end of the footplate is fixed to a floor panel, which is provided below a driver's seat. The housing is spaced apart from the footplate and fixed to a dashboard. A middle portion of the pedal arm between both ends thereof is attached to the housing by a first connector so as to elastically rotate, and one end of the pedal arm facing the footplate is attached to the other end of the footplate by a second connector so as to elastically rotate. Accordingly, it is possible to improve the durability and life span of the accelerator pedal, to significantly improve operation feeling and safety of the accelerator pedal, and to prevent operation noise from being generated.

5 Claims, 9 Drawing Sheets

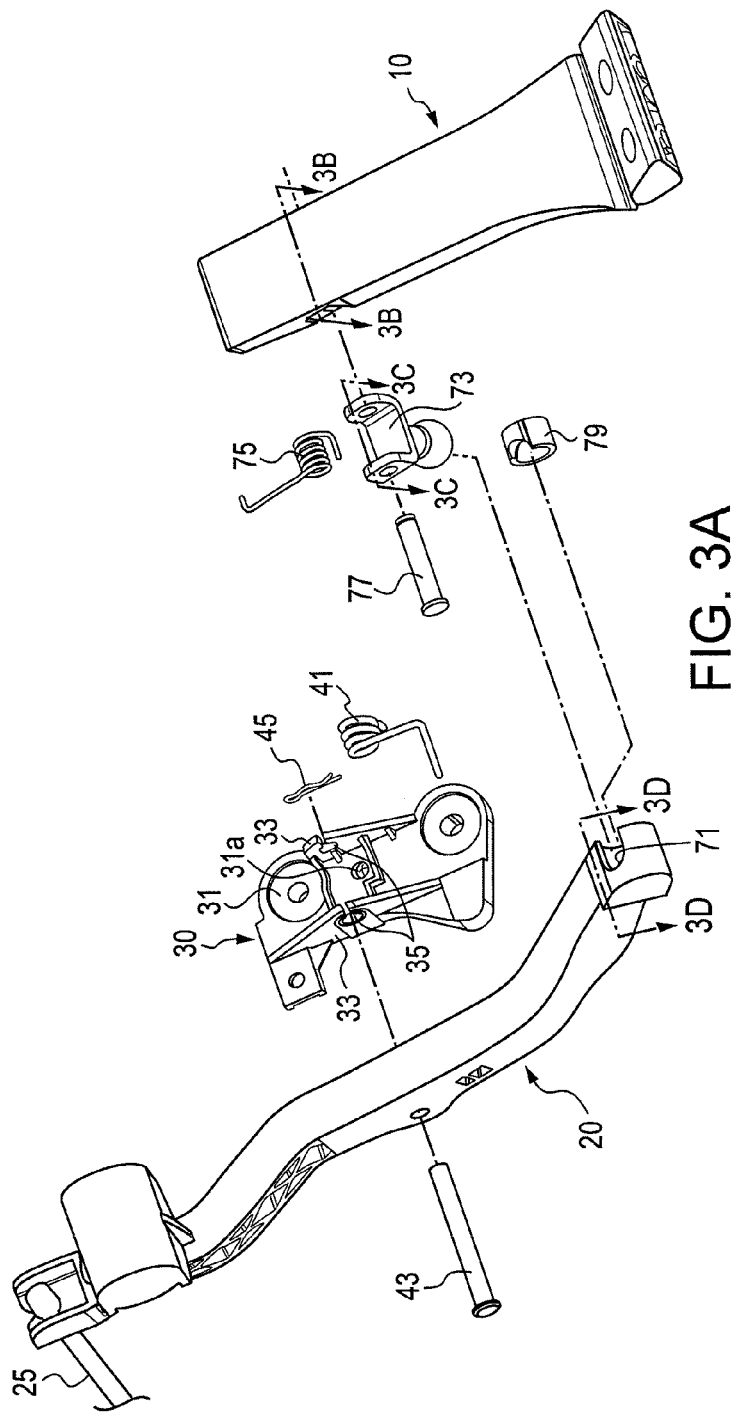
FIG. 3A
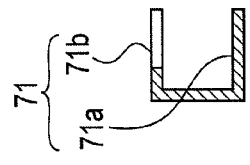
FIG. 3C
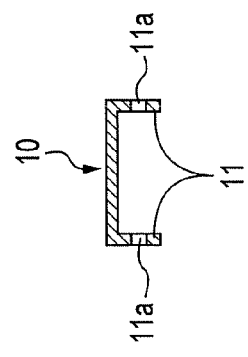
FIG. 3B
FIG. 3D

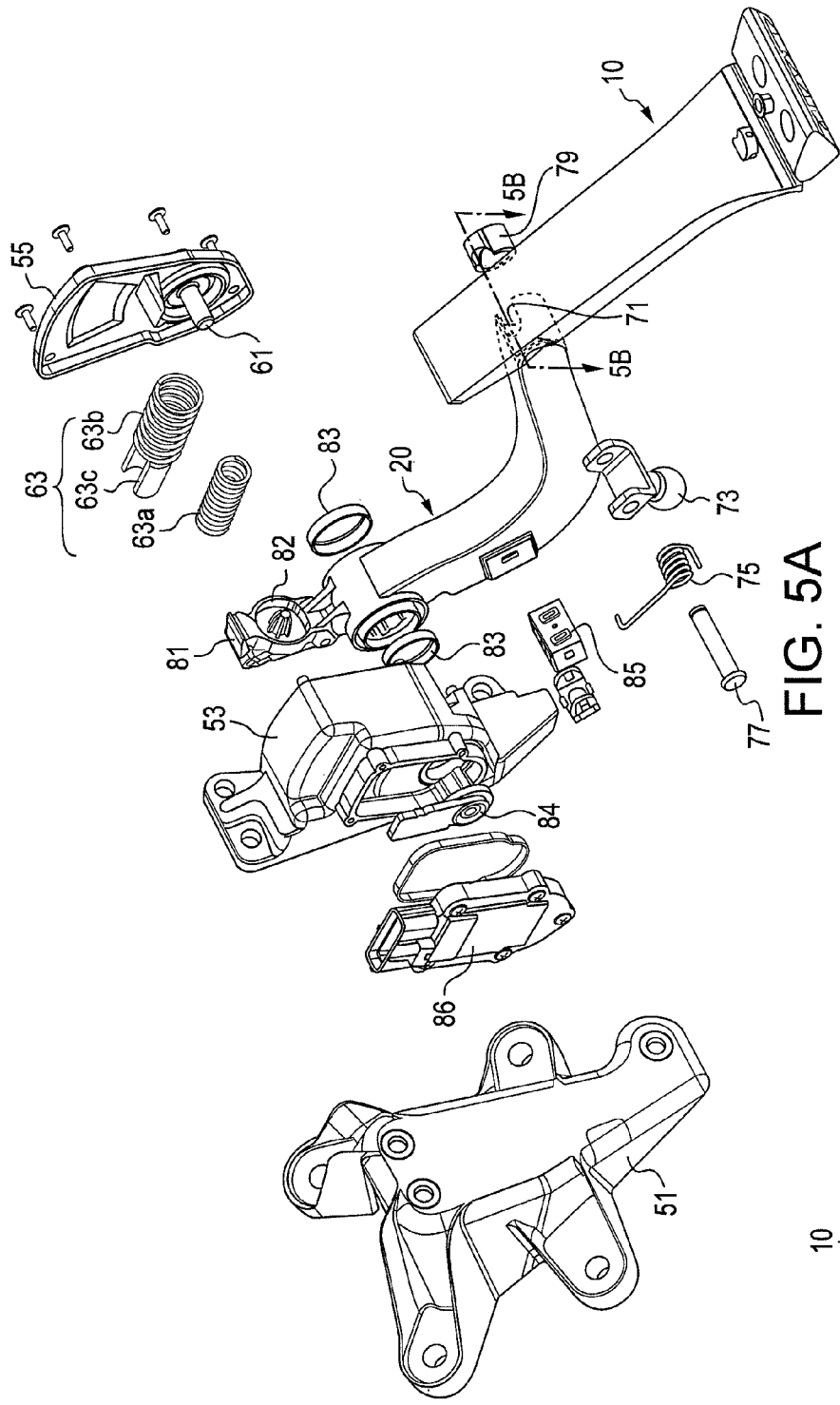
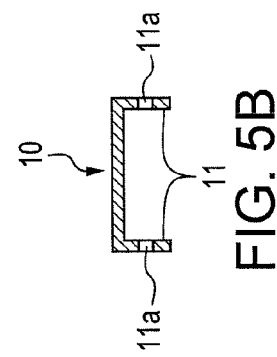
FIG. 5A
FIG. 5B

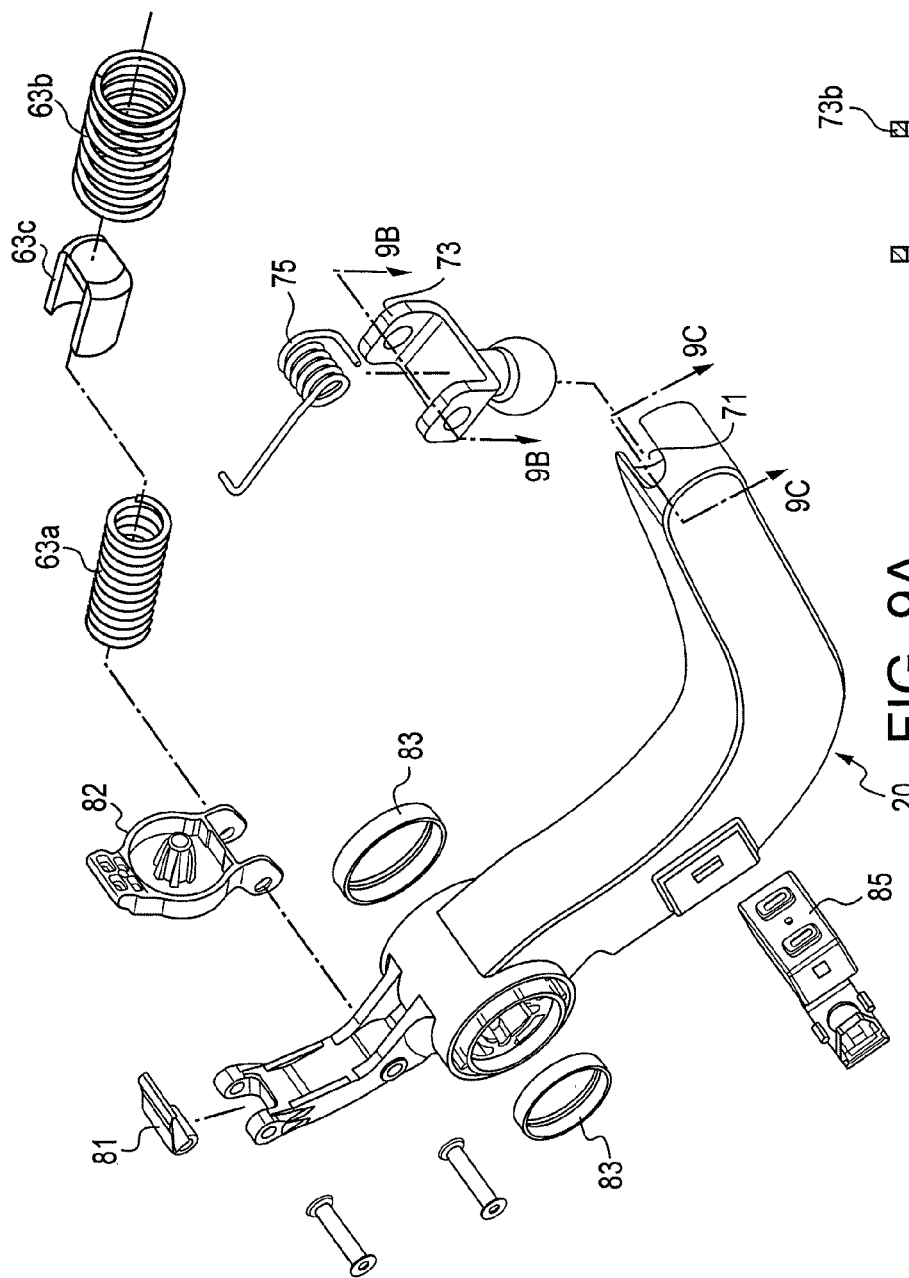
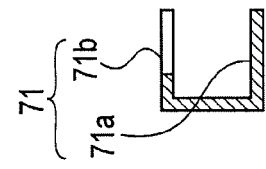
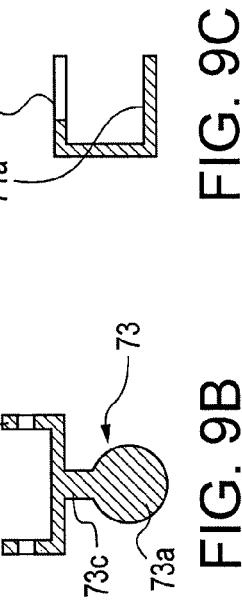
FIG. 9A
FIG. 9B
FIG. 9C

ORGAN TYPE ACCELERATOR PEDAL FOR VEHICLE

CROSS-REFERENCE TO RELATED APPLICATIONS

The present application is based on, and claims priority from, Korean Application Serial Number 10-2006-0097637, filed on Oct. 4, 2006, the disclosure of which is hereby incorporated by reference herein in its entirety.

FIELD OF THE INVENTION

The present invention relates to an organ type accelerator pedal for a vehicle.

BACKGROUND OF THE INVENTION

In general, an accelerator pedal for a vehicle is used to control the amount of air-fuel mixture in the case of a gasoline engine and to control the amount of injected fuel in the case of a diesel engine in order to adjust the engine's RPM.

Accelerator pedals are classified into a pendant type accelerator pedal and an organ type accelerator pedal depending on mounting structure, and the pendant type accelerator pedal of the accelerator pedals is widely used at present.

Meanwhile, when a driver operates the pendant type accelerator pedal, a driver is fatigued with poor operation feeling caused by low reactivity. Further, the driver cannot accurately control a throttle valve, which causes unnecessary waste of fuel. Accordingly, fuel efficiency deteriorates and safety deteriorates. For this reason, it has lately been a trend to use an organ type accelerator pedal in some expensive vehicles.

Most of the organ type accelerator pedals, which have been developed so far, include a footplate that is attached to a housing, and the housing that is provided at one position on a floor panel provided below a driver's seat. According to the above-mentioned structure, a driver's operational force is concentrated on the floor panel through the housing. Therefore, there is a problem in that durability deteriorates at the mounting portion of the housing due to frequent use.

Further, since a footplate and a housing are attached using film hinges or bolts for the organ type accelerator pedal in the related art, a clearance may occur between the footplate and the housing and torsion generated during the operation of the footplate cannot be effectively absorbed. Therefore, there are problems in that operation feeling deteriorates and operation noise is generated.

SUMMARY OF THE INVENTION

The present invention provides an organ type accelerator pedal for a vehicle where a footplate and a housing are fixed to a floor panel provided below a driver's seat and a dash panel such that a driver's operational force is distributed to the floor panel and the dash panel, thereby improving durability and life span of the accelerator pedal.

Further, the present invention provide an organ type accelerator pedal for a vehicle where attachment structure of a footplate and a housing does not have clearance and can effectively absorb torsion generated during the operation of the footplate, thereby improving operation feeling and preventing operation noise from being generated.

An organ type accelerator pedal according to an embodiment of the present invention includes a footplate, a housing, and a pedal arm. One end of the footplate is fixed to a floor panel, which is provided below a driver's seat. The housing is spaced apart from the footplate and fixed to a dash panel. A middle portion of the pedal arm between both ends thereof is attached to the housing by a first connector so as to elastically rotate, and one end of the pedal arm facing the footplate is attached to the other end of the footplate by a second connector so as to elastically rotate.

BRIEF DESCRIPTION OF THE DRAWINGS

For a better understanding of the nature and objects of the present invention, reference should be made to the following detailed description with the accompanying drawings, in which:

FIG. 3A is an exploded perspective view of FIG. 1;

FIG. 3B is a cross-sectional view of the footplate shown in FIG. 3A;

FIG. 3C is a cross-sectional view of the carrier shown in FIG. 3A;

FIG. 3D is a cross-sectional view of the carrier groove shown in FIG. 3A;

FIG. 5A is a view showing an electronic organ type accelerator pedal according to a second embodiment of the present invention;

FIG. 5B is a cross-sectional view of the footplate shown in FIG. 5A;

FIG. 9A is an exploded perspective view of a pedal arm and first and second connectors, which are separated from the accelerator pedal shown in FIG. 5A;

FIG. 9B is a cross-sectional view of the carrier shown in FIG. 9A; and

FIG. 9C is a cross-sectional view of the carrier groove shown in FIG. 9A.

DETAILED DESCRIPTION OF THE PREFERRED EMBODIMENTS

Figure 1:
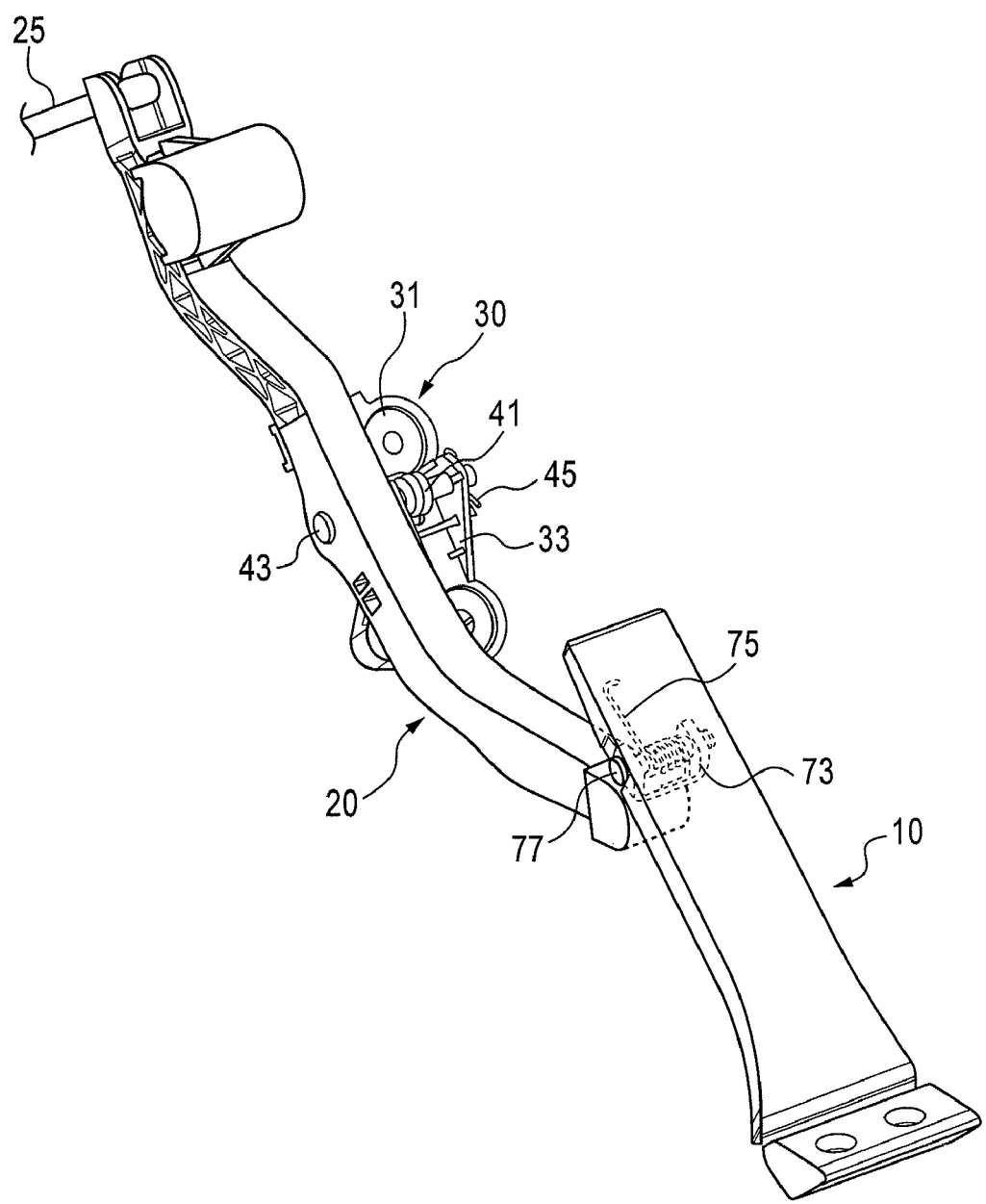
FIG. 1 is a view showing a mechanical organ type accelerator pedal according to a first embodiment of the present invention.
Figure 2:
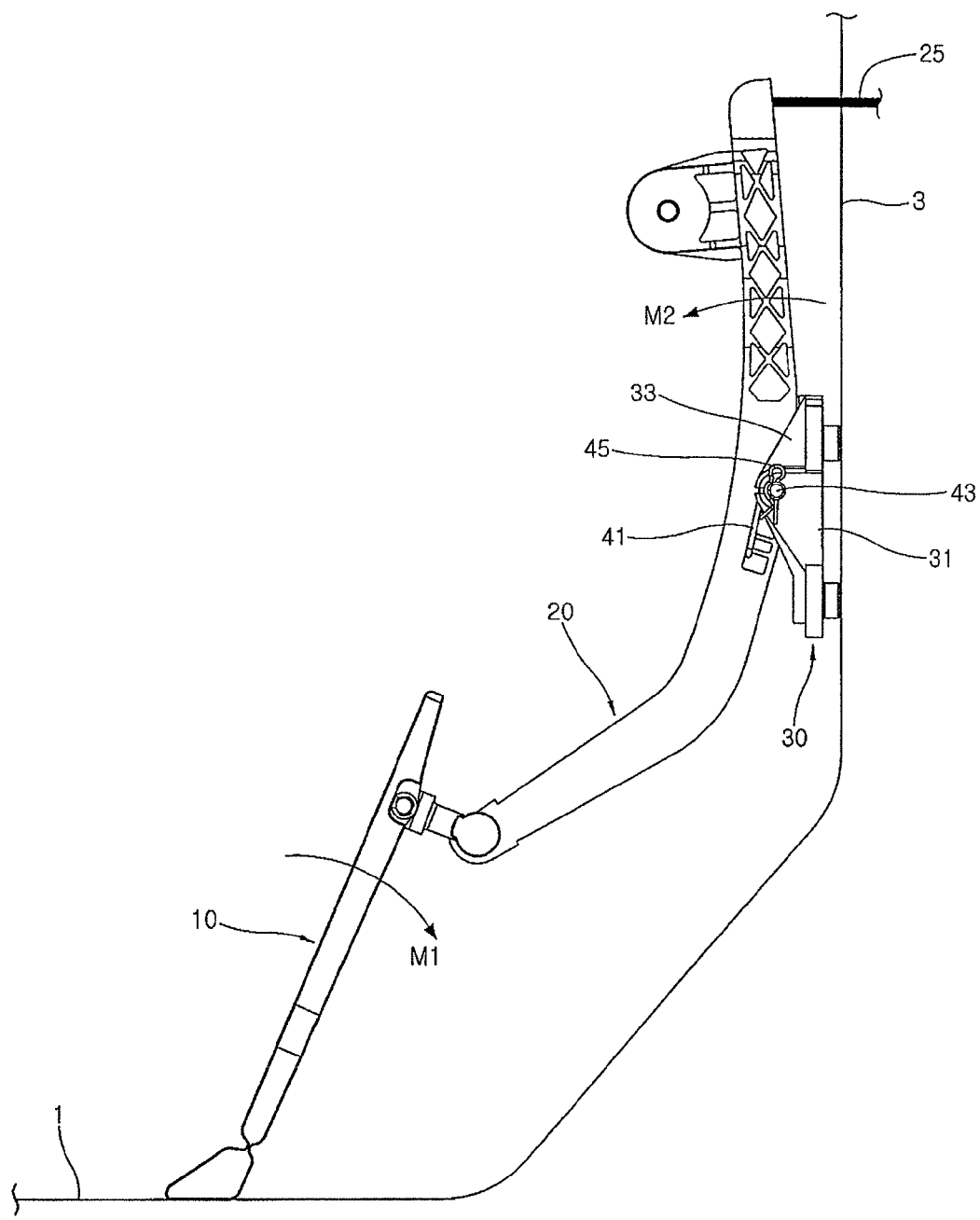
FIG. 2 is a right side view of FIG. 1.

As shown in FIGS. 1 to 4, a mechanical organ type accelerator pedal according to a first embodiment of the present invention includes a footplate 10, a housing, and a pedal arm 20. One end of footplate 10 is fixed to a floor panel 1, which is provided below a driver's seat. The housing is spaced apart from footplate 10 and fixed to a dash panel 3. A middle portion of pedal arm 20 between both ends thereof is attached to the housing by a first connector so as to elastically rotate, and one end of the pedal arm facing footplate 10 is attached to the other end of footplate 10 by a second connector so as to elastically rotate.

The housing is a pedal arm bracket 30. Pedal arm bracket 30 has a mating surface 31, a pair of flange surfaces 33, and bracket holes 35. Mating surface 31 is attached to dash panel 3 by fasteners while being in surface contact with the dash panel. The pair of flange surfaces 33 protrudes from both sides of mating surface 31 toward pedal arm 20. Bracket holes 35 pass through flange surfaces 33 so that the second connector is fitted to the bracket holes.

In this case, footplate 10 and pedal arm bracket 30 are attached using fasteners such as bolts or screws.

Meanwhile, the first connector includes a pedal arm return spring 41, a pedal arm hinge pin 43, and a snap pin 45. When one side surface of pedal arm 20 overlaps the outer side surface of flange surface 33, one end of the pedal arm return spring is fitted to mating surface 31 and the other end of the pedal arm return spring is fitted to pedal arm 20 so that the pedal arm return spring applies an elastic restoring force to pedal arm 20. Pedal arm hinge pin 43 sequentially passes through pedal arm 20, bracket holes 35, and pedal arm return spring 41, and serves as a pivot of pedal arm 20. Snap pin 45 is fitted to an end of pedal arm hinge pin 43 passing through bracket holes 35, and prevents the separation of pedal arm hinge pin 43.

Figure 4:
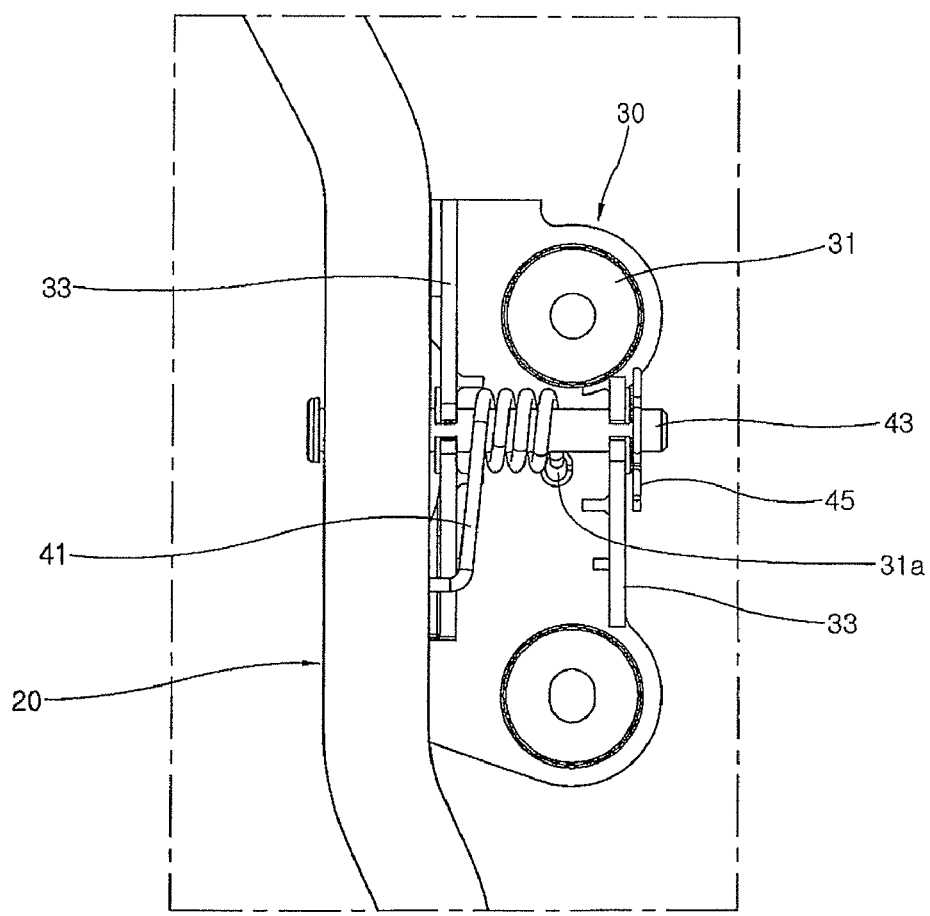
FIG. 4 is an enlarged plan view of a portion, where a pedal arm and a pedal arm bracket are attached to each other, shown in FIG. 1.

Reference numeral 31a, which is shown in FIGS. 3A and 4 but not described above, indicates a spring hole into which pedal arm return spring 41 is fitted.

Further, the second connector includes a carrier groove 71, plate holes 11a, a carrier 73, a footplate return spring 75, a footplate hinge pin 77, and a cap 79. Carrier groove 71 includes a side groove 71a that is opened toward one side at one end of pedal arm 20 facing footplate 10, and an upper groove 71b that is opened upward. Plate holes 11a are formed to pass through flange surfaces 11 that are formed on both sides of footplate 10 in a direction toward carrier groove 71. Carrier 73 includes a ball 73a that is inserted into side groove 71a, yokes 73b that are provided between flange surfaces 11 and overlap flange surfaces 11, and a connecting part 73c that connects ball 73a with yokes 73b and passes through upper groove 71b. When being inserted into yokes 73b, one end of footplate return spring 75 is fitted into yokes 73b and the other end thereof is supported by the lower surface of footplate 10 so that footplate return spring 75 applies an elastic restoring force to footplate 10. Footplate hinge pin 77 sequentially passes through plate holes 11a, yokes 73b, and footplate return spring 75, and serves as a pivot of footplate 10. Cap 79 closes side groove 71a.

An accelerator cable 25 is fixed to the end of pedal arm 20 of the mechanical organ type accelerator pedal according to the first embodiment of the present invention. When a driver steps on footplate 10 so as to apply a force to the footplate, footplate 10 is rotated in a clockwise direction indicated by an arrow M1 shown in FIG. 2. Accordingly, pedal arm 20 is rotated about pedal arm hinge pin 43 in a counterclockwise direction indicated by an arrow M2 shown in FIG. 2, and pulls accelerator cable 25, so that a throttle valve is opened so as to control the amount of air-fuel mixture.

An electronic organ type accelerator pedal according to a second embodiment of the present invention will be described below.

As shown in FIGS. 5A to 9C, an electronic organ type accelerator pedal includes a footplate 10, a housing, and a pedal arm 20. One end of footplate 10 is fixed to a floor panel 1, which is provided below a driver's seat. The housing is spaced apart from footplate 10 and fixed to a dash panel 3. A middle portion of pedal arm 20 between both ends thereof is attached to the housing by a first connector so as to elastically rotate, and one end of the pedal arm facing footplate 10 is attached to the other end of footplate 10 by a second connector so as to elastically rotate.

The housing includes a lower bracket 51, an upper bracket 53, and a cover bracket 55. Lower bracket 51 is attached to dash panel 3 by fasteners while being in surface contact with the dash panel. Upper bracket 53 is integrally attached to a front surface of lower bracket 51 by fasteners. Further, the upper bracket has a receiving space 53a, which is opened at one side of the upper bracket, therein so that pedal arm 20 is partially received in receiving space 53a. Cover bracket 55 is attached to the opened side of upper bracket 53 so as to close receiving space 53a.

In this case, footplate 10 and lower bracket 51 are attached using fasteners such as bolts or screws.

Meanwhile, the first connector includes a cover bracket hinge protrusion 61 and a pedal arm return spring 63. Cover bracket hinge protrusion 61 protrudes from an inner surface of cover bracket 55 so as to be integrally formed with the cover bracket, and passes through pedal arm 20 received in receiving space 53a so as to serve as a pivot of pedal arm 20. One end of pedal arm return spring 63 is supported by an upper surface of the end of pedal arm 20 received in receiving space 53a, and the other end of the pedal arm return spring is supported by an inner surface upper bracket 53 that faces the upper surface of the end of pedal arm 20, so that the pedal arm return spring applies an elastic restoring force to pedal arm 20.

In this case, a compression spring is used as pedal arm return spring 63, and has a double structure where an inner spring 63a and an outer spring 63b having different diameters are used. In this case, inner spring 63a is inserted into outer spring 63b.

Further, a pad 63c is provided between inner spring 63a and outer spring 63b so as to prevent the springs from interfering with each other, and a sponge is used as pad 63c.

Further, the second connector includes a carrier groove 71, plate holes 11a, a carrier 73, a footplate return spring 75, a footplate hinge pin 77, and a cap 79. Carrier groove 71 includes a side groove 71a that is opened toward one side at one end of pedal arm 20 facing footplate 10, and an upper groove 71b that is opened upward. Plate holes 11a are formed to pass through flange surfaces 11 that are formed on both sides of footplate 10 in a direction toward carrier groove 71. Carrier 73 includes a ball 73a that is inserted into side groove 71a, yokes 73b that are provided between flange surfaces 11 and overlap flange surfaces 11, and a connecting part 73c that connects ball 73a with yokes 73b and passes through upper groove 71b. When being inserted into yoke 73b, one end of footplate return spring 75 is fitted into yoke 73b and the other end thereof is supported by the lower surface of footplate 10 so that footplate return spring 75 applies an elastic restoring force to footplate 10. Footplate hinge pin 77 sequentially passes through plate holes 11a, yoke 73b, and footplate return spring 75, and serves as a pivot of footplate 10. Cap 79 closes side groove 71a.

Meanwhile, the electronic organ type accelerator pedal according to the second embodiment of the present invention further includes a friction shoe 81 and a spring plate 82 that are attached to the end of pedal arm 20 received in receiving space 53a, and pedal arm return spring 63 is supported by spring plate 82.

The electronic organ type accelerator pedal according to the second embodiment of the present invention further includes bushings 83, a sensor 84, and a kick-down switch 85. Bushings 83 prevent the abrasion of pedal arm 20, which is caused by the friction during the operation of the pedal arm. Sensor 84 detects a change in the output corresponding to the rotation of pedal arm 20, and generates an electrical signal so as to transmit the electrical signal to a throttle control unit. Kick-down switch 85 can improve the acceleration performance of a vehicle.

Figure 6:
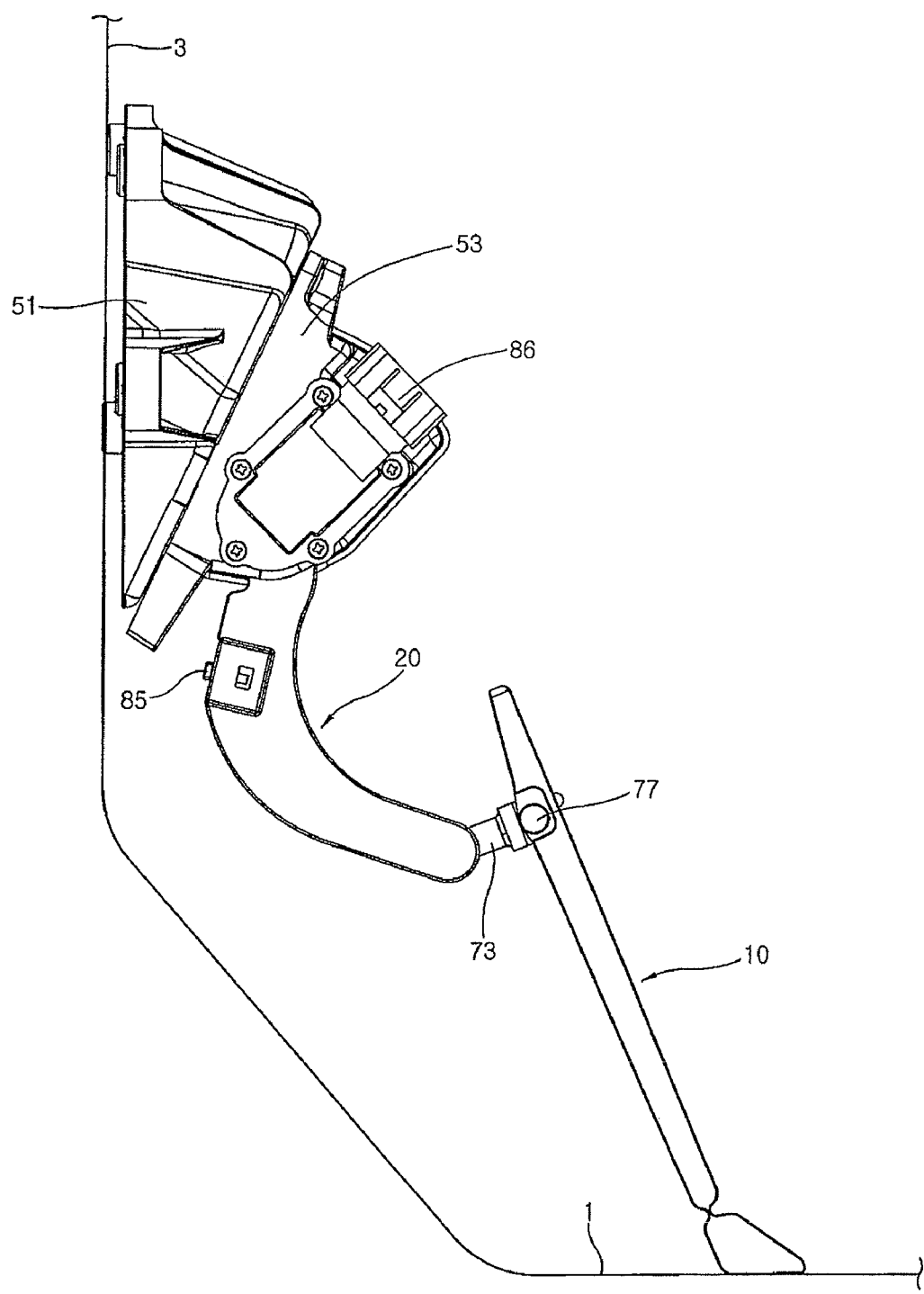
FIG. 6 is a left side view of an assembled accelerator pedal of FIG. 5A.
Figure 7:
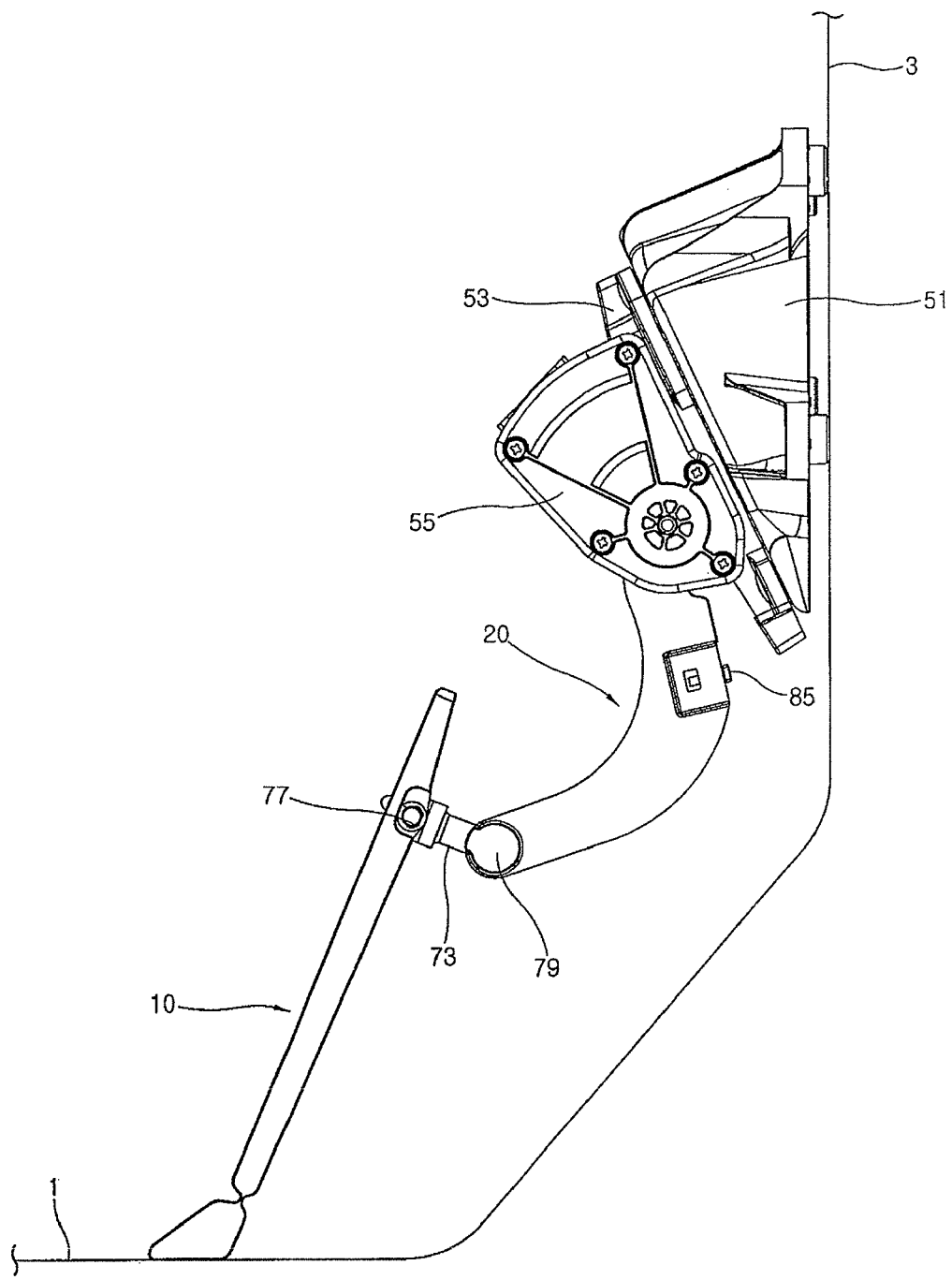
FIG. 7 is a right side view of the assembled accelerator pedal of FIG. 5A.

Reference numeral 86, which is shown in FIGS. 5A and 6 but not described above, indicates a sensor cover for protecting sensor 84.

Meanwhile, friction shoe 81, spring plate 82, and sensor 84 have been described in detail in Korean Patent Application No. 10-2005-0122740, which was filed on Dec. 13, 2005. Therefore, the friction shoe, the spring plate, and the sensor will be omitted in this specification.

Figure 8:
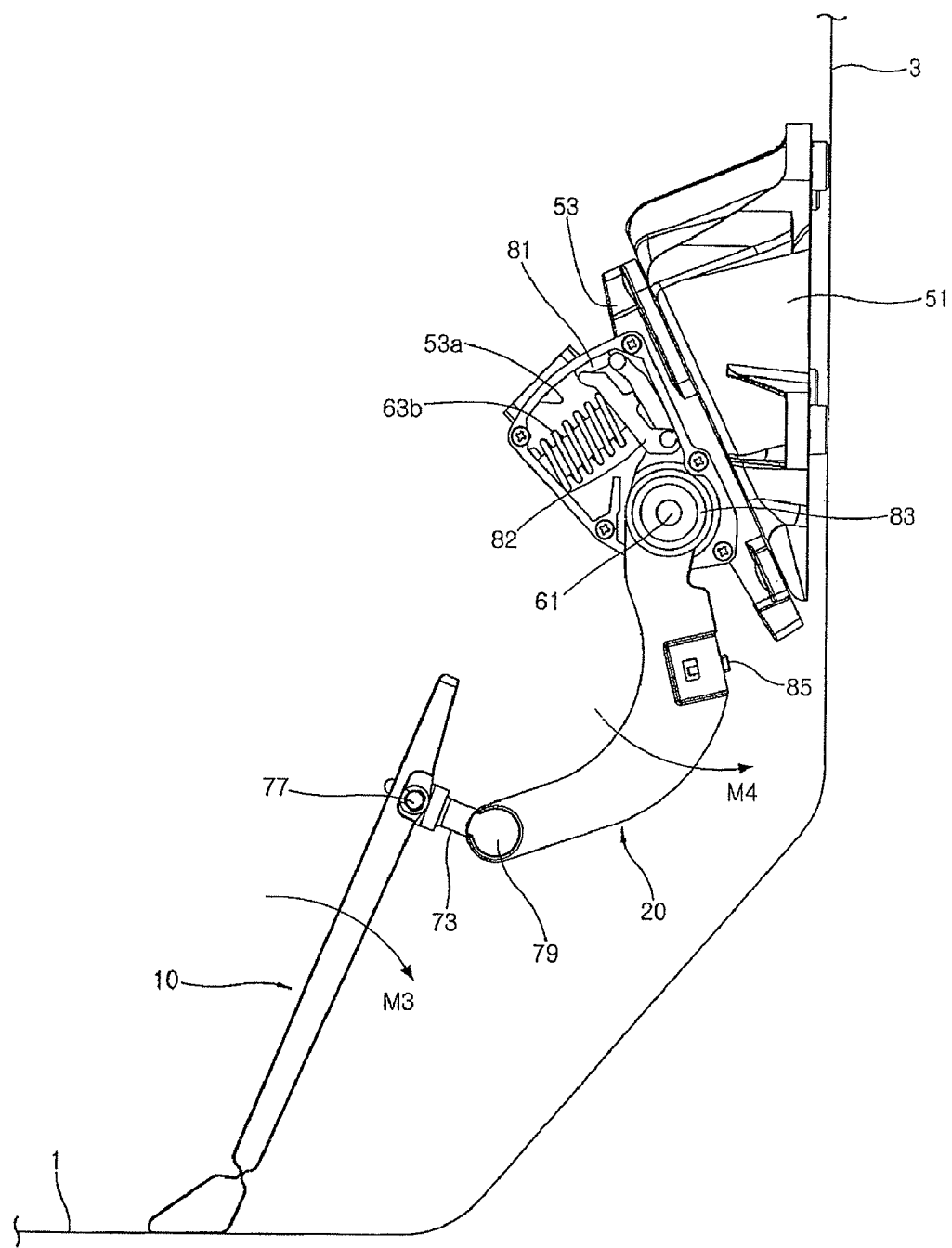
FIG. 8 is a side view of the accelerator pedal shown in FIG. 7 from which a cover bracket is removed.

When a driver steps on footplate 10 of the electronic organ type accelerator pedal according to the second embodiment of the present invention so as to apply a force to the footplate, footplate 10 is rotated in a clockwise direction indicated by an arrow M3 shown in FIG. 8. Accordingly, pedal arm 20 is rotated about cover bracket protrusion 61 in a counterclockwise direction indicated by an arrow M4 shown in FIG. 8.

Meanwhile, sensor 84 detects a change in the output corresponding to the rotation of pedal arm 20, and transmits an electrical signal to a throttle control unit. The throttle control unit transmits a control signal to an actuator to operate the actuator so that a throttle valve is opened, thereby controlling the amount of air-fuel mixture.

Therefore, in the organ type accelerator pedal according to the embodiment of the present invention, footplate 10 is fixed to floor panel 1 provided below the driver's seat, and pedal arm bracket 30 or lower bracket 51 corresponding to a housing is fixed to dash panel 3. When a driver's operational force is transmitted to footplate 10, the operational force is effectively distributed to floor panel 1 and dash panel 3 due to the above-mentioned structure.

As a result, according to the embodiments of the present invention, it is possible to improve the durability and life span of the accelerator pedal.

Further, according to the embodiments of the present invention, a separate member such as a film hinge is not used at a portion fixed to floor panel 1 and a portion operated by a driver's foot in footplate 10, and the portions are integrally formed with footplate 10. Therefore, it is possible to improve durability and to reduce manufacturing cost.

Furthermore, according to the embodiments of the present invention, carrier 73 connects footplate 10 to pedal arm 20 by using a ball joint structure. Therefore, it is possible to remove clearance between footplate 10 and pedal arm 20, which makes it possible to significantly improve operation feeling and safety.

In addition, since the clearance between footplate 10 and pedal arm 20 is removed, torsion generated during the operation of footplate 10 is effectively absorbed. As a result, it is possible to improve operation feeling and to prevent operation noise from being generated.

As described above, an organ type accelerator pedal according to an embodiment of the present invention can effectively distribute a driver's operational force to a floor panel and a dash panel. Therefore, it is possible to improve the durability and life span of the accelerator pedal. In addition, since the organ type accelerator pedal can remove clearance between the footplate and the pedal arm, it is possible to significantly improve operation feeling and safety.

What is claimed is:

1. An accelerator pedal for a vehicle, comprising:
   a footplate of which one end is fixed to a floor panel provided below a driver's seat;
   a housing that is spaced apart from the footplate and fixed to a dash panel; and
   a pedal arm of which a middle portion between both ends thereof is attached to the housing by a first connector so as to elastically rotate and one end facing the footplate is attached to the other end of the footplate by a second connector so as to elastically rotate, wherein the second connector includes:
   a carrier groove that includes a side groove opened toward one side at one end of the pedal arm facing the footplate, and an upper groove opened upward;
   plate holes that are formed to pass through flange surfaces formed on both sides of the footplate in a direction toward the carrier groove;
   a carrier including a ball that is inserted into the side groove, yokes that are provided between the flange surfaces and overlaps the flange surfaces, and a connecting part that connects the ball with the yokes and passes through the upper groove;
   a footplate return spring of which one end is fitted into the yokes and the other end is supported by the lower surface of the footplate so as to apply an elastic restoring force to the footplate, when being inserted into the yokes;
   a footplate hinge pin that sequentially passes through the plate holes, the yokes, and the footplate return spring, and serves as a pivot of the footplate; and
   a cap that closes the side groove.

2. The organ type accelerator pedal as defined in claim 1, wherein the housing is a pedal arm bracket including a mating surface attached to the dash panel by fasteners while being in surface contact with the dash panel, a pair of flange surfaces protruding from both sides of the mating surface toward the pedal arm, and bracket holes passing through the flange surfaces so that the second connector is fitted to the bracket holes.

3. The organ type accelerator pedal as defined in claim 2, wherein the first connector includes:
   a pedal arm return spring of which one end is fitted to the mating surface and the other end is fitted to the pedal arm so as to apply an elastic restoring force to the pedal arm while one side surface of the pedal arm overlaps the outer side surface of the flange surface;
   a pedal arm hinge pin that sequentially passes through the pedal arm, the bracket holes, and the pedal arm return spring, and serves as a pivot of the pedal arm; and
   a snap pin that is fitted to an end of the pedal arm hinge pin passing through the bracket holes and prevents the separation of the pedal arm hinge pin.

4. The organ type accelerator pedal as defined in claim 1, wherein the housing includes:
   a lower bracket coupled to the dash panel by fasteners while being in surface contact with the dash panel;
   an upper bracket integrally attached to a front surface of the lower bracket by fasteners, and having a receiving space, which is opened at one side of the upper bracket, therein so that the pedal arm is partially received in the receiving space; and
   a cover bracket that is attached to the opened side of the upper bracket so as to close the receiving space.

5. The organ type accelerator pedal as defined in claim 4, wherein the first connector includes:
   a cover bracket hinge protrusion that protrudes from an inner surface of the cover bracket so as to be integrally formed with the cover bracket and passes through the pedal arm received in the receiving space so as to serve as a pivot of the pedal arm; and
   a pedal arm return spring of which one end is supported by an upper surface of the end of the pedal arm received in the receiving space and the other end is supported by an inner surface upper bracket that faces the upper surface of the end of the pedal arm, so that the pedal arm return spring applies an elastic restoring force to the pedal arm.

* * * * *